United States Patent [19]
Yamamoto et al.

[11] Patent Number: 5,367,403
[45] Date of Patent: Nov. 22, 1994

[54] OPTICAL ELEMENT AND METHOD OF FABRICATING THE SAME

[75] Inventors: Hiroaki Yamamoto; Seiji Nishino; Kazuhisa Yamamoto, all of Osaka, Japan

[73] Assignee: Matsushita Electric Industrial Co., Ltd., Osaka, Japan

[21] Appl. No.: 43,228

[22] Filed: Apr. 6, 1993

[30] Foreign Application Priority Data

Apr. 8, 1992 [JP] Japan .................. 4-086853

[51] Int. Cl.$^5$ .................. G02B 5/18; G02B 5/30; G02B 27/28
[52] U.S. Cl. .................. 359/494; 359/495; 359/566; 359/569; 385/11
[58] Field of Search .............. 359/487, 494, 495, 566, 359/569; 385/11

[56] References Cited

U.S. PATENT DOCUMENTS

| | | | |
|---|---|---|---|
| 4,778,234 | 10/1988 | Papuchon et al. | 385/11 |
| 4,991,937 | 2/1991 | Urino | 359/566 |
| 5,024,726 | 6/1991 | Fujiwara | 359/566 |
| 5,029,988 | 7/1991 | Urino | 359/566 |
| 5,245,471 | 9/1993 | Iwatsuka et al. | 359/495 |

FOREIGN PATENT DOCUMENTS

| | | | |
|---|---|---|---|
| 0349144 | 1/1990 | European Pat. Off. | |
| 484626 | 5/1992 | European Pat. Off. | 359/495 |
| 63-314502 | 12/1988 | Japan . | |
| 1-107206 | 4/1989 | Japan . | |
| 1-129517 | 5/1989 | Japan . | |
| 2-12106 | 1/1990 | Japan | 359/494 |
| 2-178604 | 7/1990 | Japan | 359/487 |
| 3-31803 | 2/1991 | Japan | 359/487 |
| 4-104232 | 4/1992 | Japan | 385/11 |
| 4-212132 | 8/1992 | Japan | 385/11 |

*Primary Examiner*—Martin Lerner
*Attorney, Agent, or Firm*—Lowe, Price, LeBlanc & Becker

[57] ABSTRACT

An optical element includes a crystal of $LiTa_XNb_{1-X}O_3$ which has one of an x-surface and a y-surface, where X denotes an atomic fraction and $0 \leq X \leq 1$. Proton-exchanged layers periodically extend on one of the x-surface and the y-surface of the crystal. Grooves extend in said one of the x-surface and the y-surface of the crystal, and have bottoms which are defined by surfaces of the proton-exchanged layers. Ordinary light which has passed through the proton-exchanged layers and the grooves is out of phase with respect to ordinary light which has passed through a region of the crystal outside the proton-exchanged layers and the grooves by a quantity of $(2n+1)\pi$, where n denotes an arbitrary integer. Extraordinary light which has passed through the proton-exchanged layers and the grooves is out of phase with respect to extraordinary light which has passed through a region of the crystal outside the proton-exchanged layers and the grooves by a quantity of $2m\pi$, where m denotes an arbitrary integer.

4 Claims, 5 Drawing Sheets

OPTICAL ELEMENT AND METHOD OF FABRICATING THE SAME

BACKGROUND OF THE INVENTION

1. Field of the Invention

This invention relates to an optical element such as a polarization separating element or a polarization anisotropic hologram element. This invention also relates to a method of fabricating an optical element. This invention further relates to an optical information processing apparatus.

2. Description of the Prior Art

Japanese published unexamined patent application 63-314502 discloses a polarization separating element usable in an optical communication system. The polarization separating element of Japanese patent application 63-314502 includes a substrate of lithium niobate, proton-exchanged layers, and dielectric films. The proton-exchanged layers are periodically formed on a surface of the substrate at intervals. The dielectric films are formed on and aligned with the proton-exchanged layers respectively. In the polarization separating element of Japanese patent application 63-314502, lithium-niobate substrate portions covered with the proton-exchanged layers and the dielectric films alternate with lithium-niobate substrate portions uncovered therefrom. In the following description, the substrate portions covered with the proton-exchanged layers and the dielectric films will also be referred to as the covered substrate portions, while the substrate portions uncovered therefrom will also be referred to as the uncovered substrate portions.

The relation or ratio in refractive index between the lithium-niobate substrate and the proton-exchanged layer varies in accordance with which of an ordinary ray of light and an extraordinary ray of light is applied thereto.

The polarization separating element of Japanese patent application 63-314502 operates as follows. In the case of an extraordinary ray of light, the part of the light which has passed through the covered substrate portions is delayed in phase relative to the part of the light which has passed through the uncovered substrate portions. The phase delay is caused by the difference in refractive index between the dielectric film and air, and the difference in refractive index between the proton-exchanged layer and the lithium niobate substrate. As a result of the phase delay, the extraordinary ray is diffracted by the polarization separating element. In the case of an ordinary ray of light, the dielectric films compensate for a phase difference which might be caused between the part of the light which passes through the covered substrate portions and the part of the light which passes through the uncovered substrate portions. Specifically, the difference in refractive index between the dielectric film and air, and the difference in refractive index between the proton-exchanged layer and the lithium-niobate substrate cancel the phase difference. Thus, the ordinary ray is un-diffracted by the polarization separating element.

During the fabrication of the polarization separating element of Japanese patent application 63-314502, the formation of the dielectric films and the alignment between the dielectric films and the proton-exchanged layers necessitate troublesome and laborious steps.

SUMMARY OF THE INVENTION

It is a first object of this invention to provide an improved optical element.

It is a second object of this invention to provide an improved method of fabricating an optical element.

It is a third object of this invention to provide an improved optical information processing apparatus.

A first aspect of this invention provides an optical element comprising a crystal of $LiTa_XNb_{1-X}O_3$ which has one of an x-surface and a y-surface, where X denotes an atomic fraction and $0 \leq X \leq 1$; proton-exchanged layers periodically extending on one of the x-surface and the y-surface of the crystal; and grooves extending in said one of the x-surface and the y-surface of the crystal and having bottoms which are defined by surfaces of the proton-exchanged layers; wherein ordinary light which has passed through the proton-exchanged layers and the grooves is out of phase with respect to ordinary light which has passed through a region of the crystal outside the proton-exchanged layers and the grooves by a quantity of $(2n+1)\pi$, and n denotes an arbitrary integer; and wherein extraordinary light which has passed through the proton-exchanged layers and the grooves is out of phase with respect to extraordinary light which has passed through a region of the crystal outside the proton-exchanged layers and the grooves by a quantity of $2m\pi$, and m denotes an arbitrary integer.

A second aspect of this invention provides an optical element comprising a crystal of $LiTa_XNb_{1-X}O_3$ which has one of an x-surface and a y-surface, where X denotes an atomic fraction and $0 \leq X \leq 1$; proton-exchanged layers periodically extending on one of the x-surface and the y-surface of the crystal; and grooves extending in said one of the x-surface and the y-surface of the crystal and having bottoms which are defined by surfaces of the proton-exchanged layers; wherein ordinary light which has passed through the proton-exchanged layers and the grooves is out of phase with respect to ordinary light which has passed through a region of the crystal outside the proton-exchanged layers and the grooves by a quantity of $2m\pi$, and m denotes an arbitrary integer; and wherein extraordinary light which has passed through the proton-exchanged layers and the grooves is out of phase with respect to extraordinary light which has passed through a region of the crystal outside the proton-exchanged layers and the grooves by a quantity of $(2n+1)\pi$, and n denotes an arbitrary integer.

A third aspect of this invention provides a method of fabricating an optical element which comprises the steps of preparing a crystal of $LiTa_XNb_{1-X}O_3$ which has a surface, where X denotes an atomic fraction and $0 \leq X \leq 1$; forming proton-exchanged layers on the surface of the crystal; and etching away parts of the proton-exchanged layers to form grooves in the surface of the crystal.

A fourth aspect of this invention provides an optical information processing apparatus comprising a polarization separating element for separating incident light into diffracted light and nondiffracted light, the polarization separating element having first and second efficiencies for the diffracted light and the nondiffracted light respectively, the first and second efficiencies being different from each other; a first photodetector element for detecting the diffracted light; a first amplifier for amplifying an output signal of the first photodetector element; a second photodetector element for detecting the nondiffracted light; a second amplifier for amplifying an output signal of the second photodetector element; wherein the first amplifier has a first predetermined amplification factor and the second amplifier has a second predetermined amplification factor, and the first and second amplification factors are dependent on the first and second efficiencies to compensate for a difference between the first and second efficiencies of the polarization separating element.

A fifth aspect of this invention provides an optical element comprising a substrate having a surface; a proton-exchanged layer extending on the surface of the substrate; and an unoccupied groove extending in the surface of the substrate and aligning with the proton-exchanged layer, the groove having a bottom at which the proton-exchanged layer is exposed.

DESCRIPTION OF THE FIRST PREFERRED EMBODIMENT

Figure 1:
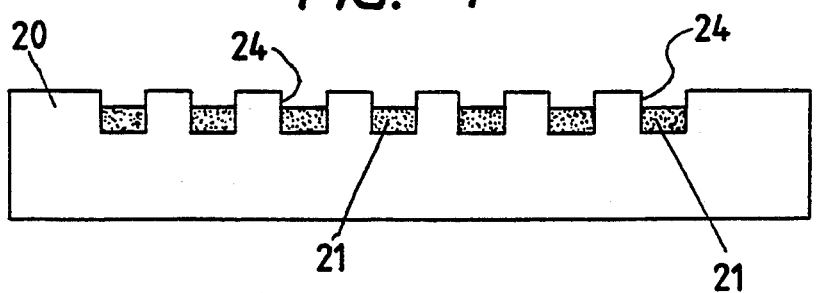
FIG. 1 is a sectional view of a polarization separating element according to a first embodiment of this invention.
Figure 10:
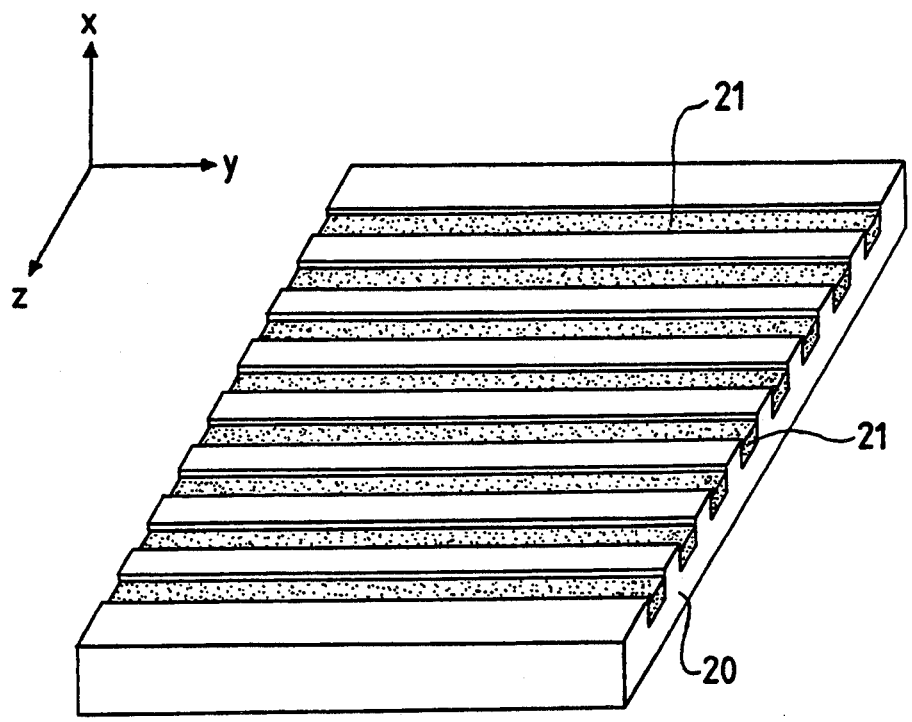
FIG. 10 is a perspective view of the polarization separating element of the first embodiment.

With reference to FIGS. 1 and 10, an optical element or a polarization separating element includes an x-plane (x-face) lithium-niobate crystal substrate 20. Proton-exchanged layers 21 having a predetermined thickness or depth "dp" are periodically formed on an upper surface (x-plane) of the lithium-niobate substrate 20 at intervals. The proton-exchanged layers 21 elongate along the y-axis of the lithium-niobate crystal. In addition, the proton-exchanged layers 21 are spaced in the z-axis of the lithium-niobate crystal. Portions of the lithium-niobate substrate 20 which extend outside the proton-exchanged layers 21 emerge or project upward from the proton-exchanged layers 21. In other words, the portions of the substrate which extend outside the proton-exchanged layers 21 form spaced lands between which the proton-exchanged layers 21 extend. Thus, the surface 20 of the lithium-niobate substrate has spaced grooves 24 defined between the land portions. The proton-exchanged layers 21 are aligned with the grooves 24 in the x-axis direction of the lithium-niobate crystal respectively, and are exposed at the bottoms of the grooves 24 respectively. The grooves 24 have a predetermined depth "da".

An example of typical values of the refractive indexes of the lithium-niobate substrate 20 and the proton-exchanged layers 21 will be indicated in the following:

no=2.264
ne=2.177
nop=2.260
nep=2.322 where "no" denotes the refractive index of the lithium-niobate substrate 20 with respect to an ordinary ray of light; "ne" denotes the refractive index of the lithium-niobate substrate 20 with respect to an extraordinary ray of light; "nop" denotes the refractive index of the proton-exchanged layers 21 with respect to an ordinary ray of light; and "nep" denotes the refractive index of the proton-exchanged layers 21 with respect to an extraordinary ray of light. It should be noted that the refractive indexes of the lithium-niobate substrate 20 and the proton-exchanged layers 21 slightly vary according to conditions of the fabrication of the substrate and conditions of the proton exchange.

The character "$\Delta no$" is now introduced as an indication of the difference between the refractive indexes "no" and "nop" of the lithium-niobate substrate 20 and the proton-exchanged layers 21 with respect to an ordinary ray of light. In addition, the character "$\Delta ne$" is introduced as an indication of the difference between the refractive indexes "ne" and "nep" of the lithium-niobate substrate 20 and the proton-exchanged layers 21 with respect to an extraordinary ray of light. The refractive-index differences "$\Delta no$" and "$\Delta ne$" are given as:

$$\Delta no = nop - no \quad (1)$$

$$\Delta ne = nep - ne \quad (2)$$

When the previously-mentioned typical values of the refractive indexes are placed into the equations (1) and (2), the calculated values of the refractive-index differences "$\Delta no$" and "$\Delta ne$" are equal to $-0.04$ and $+0.145$ respectively. Thus, with respect to an ordinary ray of light, the refractive index of the proton-exchanged layers 21 is greater than the refractive index of the lithium-niobate substrate 20 by 0.145. On the other hand, with respect to an extra-ordinary ray of light, the refractive index of the proton-exchanged layers 21 is smaller than the refractive index of the lithium-niobate substrate 20 by 0.04. In this way, the relation or ratio in refractive index between the lithium-niobate substrate 20 and the proton-exchanged layers 21 varies in accordance with which of an ordinary ray of light and an extraordinary ray of light is applied thereto.

The polarization separating element uses the dependence of the refractive-index relation upon the conditions of applied light, and features that the grooves 21 compensate for a change or an unevenness in refractive index with respect to an extraordinary ray of light.

The polarization separating element operates as follows. In the case where an ordinary ray of light which has an electric-field vector in the y-axis direction of the crystal of the lithium-niobate substrate 20 is incident to the polarization separating element, a part of the light passes through portions of the lithium-niobate substrate 20 covered with the proton-exchanged layers 21 while another part of the light passes through portions of the lithium-niobate substrate 20 uncovered from the proton-exchanged layers 21. In the following description, the substrate portions covered with the proton-exchanged layers 21 will also be referred to as the covered substrate portions, while the substrate portions uncovered therefrom will also be referred to as the uncovered substrate portions. Since the refractive index of the proton-exchanged layers 21 and the refractive index of the grooves 24 (the refractive index of air) are smaller than the refractive index of the lithium-niobate substrate 20, the light which has passed through the covered portions of the substrate 20 (that is, the light which has successively passed through the grooves 24, the proton-exchanged layers 21, and the substrate 20) is advanced in phase relative to the light which has passed through the uncovered portions or the land portions of the substrate 20. Specifically, the quantity $\Delta\phi o$ of the resultant phase change is given as:

$$\Delta\phi o = (2\pi/\lambda) \bullet (\Delta no \bullet dp + \Delta noa \bullet da) \quad (3)$$

where the phase-change quantity $\Delta\phi o$ is defined as being positive for a phase delay and being negative for a phase advance; "$\lambda$" denotes the wavelength of the incident light; and "$\Delta noa$" denotes the difference between the refractive index "no" of the lithium-niobate substrate 20 with respect to an ordinary ray of light and the refractive index of air (which is equal to 1). The refractive-index difference "$\Delta noa$" is given as:

$$\Delta noa = 1 - no \quad (4)$$

In the case where an extraordinary ray of light which has an electric-field vector in the z-axis direction of the crystal of the lithium-niobate substrate 20 is incident to the polarization separating element, a part of the light passes through the covered substrate portions while another part of the light passes through the uncovered substrate portions. Since the refractive index of the grooves 24 (the refractive index of air) is smaller than the refractive index of the lithium-niobate substrate 20, the light which has passed through the grooves 24 is advanced in phase relative to the light which has passed through the uncovered portions or the land portions of the lithium-niobate substrate 20. On the other hand, since the refractive index of the proton-exchanged layers 21 is greater than the refractive index of the lithium-niobate substrate 20, the light which has passed through the proton-exchanged layers 21 is delayed in phase relative to the light which has passed through the uncovered portions or the land portions of the lithium-niobate substrate 20. In this way, the light which has passed through the covered portions of the substrate 20 (that is, the light which has successively passed through the grooves 24, the proton-exchanged layers 21, and the substrate 20) undergoes a phase advance and a phase delay in the grooves 24 and the proton-exchanged layers 21 respectively. The quantity $\Delta\phi e$ of the resultant phase change is given as:

$$\Delta\phi e = (2\pi/\lambda) \bullet (\Delta ne \bullet dp + \Delta nea \bullet da) \quad (5)$$

where the phase-change quantity $\Delta\phi e$ is defined as being positive for a phase delay and being negative for a phase advance:: "$\lambda$" denotes the wavelength of the incident light; and "$\Delta nea$" denotes the difference between the refractive index "ne" of the lithium-niobate substrate 20 with respect to an extraordinary ray of light and the refractive index of air (which is equal to 1). The refractive-index difference "$\Delta nea$" is given as:

$$\Delta nea = 1 - ne \quad (6)$$

As previously described, the light which has passed through the covered portions of the substrate 20 undergoes a phase advance and a phase delay in the grooves 24 and the proton-exchanged layers 21 respectively. The depth "da" of the grooves 24 and the depth "dp" of the proton-exchanged layers 21 are preferably chosen so as to cancel the phase advance and the phase delay provided by the grooves 24 and the proton-exchanged layers 21.

The polarization separating element diffracts an ordinary ray of light but does not diffract an extraordinary ray of light. This function of the polarization separating element is attained by the following arrangement. The depth "da" of the grooves 24 and the depth "dp" of the proton-exchanged layers 21 are chosen so that the extraordinary-ray phase-change quantity $\Delta\phi e$ given by the equation (5) will approximately equal a multiple of $2\pi$ and the ordinary-ray phase-change quantity $\Delta\phi o$ given by the equation (3) will appreciably differ from a multiple of $2\pi$. It is preferable that the ordinary-ray phase-change quantity $\Delta\phi o$ approximately equals an odd-number multiple of $\pi$ ($\pi$ times an odd integer). These conditions are expressed by the following equations.

$$(2\pi/\lambda) \bullet (\Delta no \bullet dp + \Delta noa \bullet da) = -(2n+1)\pi \quad (7)$$

$$(2\pi/\lambda) \bullet (\Delta ne \bullet dp + \Delta nea \bullet da) = 2 \, m\pi \quad (8)$$

where "m" and "n" denote arbitrary integers respectively.

Especially, in the case where m=0 and n=0, these values are placed into the equations (7) and (8) and thus the depth "da" of the grooves 24 and the depth "dp" of the proton-exchanged layers 21 are given as:

$$da = (\lambda/2)\{\Delta ne/(\Delta no\Delta nea - \Delta ne\Delta noa)\} \quad (9)$$

$$dp = (\lambda/2)\{\Delta nea/(\Delta ne\Delta noa - \Delta no\Delta nea)\} \quad (10)$$

With respect to light having a wavelength of, for example, 0.78 $\mu$m (780 nm), the depth "da" of the grooves 24 and the depth "dp" of the proton-exchanged layers 21 are preferably equal to about 0.25 $\mu$m and 2.00 $\mu$m respectively according to the equations (9) and (10). Since the refractive index of the proton-exchanged layers 21 slightly varies in accordance with conditions of the formation thereof and the actual depth of the proton-exchanged layers 21 tends to be uneven, practically preferable values of the depth "da" of the grooves 24 and the depth "dp" of the proton-exchanged layers 21 generally deviate from 0.25 $\mu$m and 2.00 $\mu$m respectively.

Experiments were performed on samples of the polarization separating element which had the proton-exchanged layers 21 with a thickness of 2.38 $\mu$m and the grooves 24 with varying depths. During the experiments, the diffraction efficiency and the transmittance were measured with respect to each sample of the polarization separating element while either an ordinary ray of light having a wavelength of 780 nm or an extraordinary ray of light having a wavelength of 780 nm was applied thereto. The samples of the polarization separating element were not prepared at once. Specifically, a single sample of the polarization separating element which had the grooves 24 with a greatest predetermined depth was prepared first. Measurements of the diffraction efficiency and the transmittance were done with respect to the first sample while an ordinary ray of light and an extraordinary ray of light were alternately applied thereto. Subsequently, the first sample of the polarization separating element was made, by a selective etching process using hydrofluoric acid, into a second sample of the polarization separating element which had the grooves 24 with a second greatest predetermined depth. Measurements of the diffraction efficiency and the transmittance were done with respect to the second sample while an ordinary ray of light and an extraordinary ray of light were alternately applied thereto. These processes were reiterated.

Figure 2:
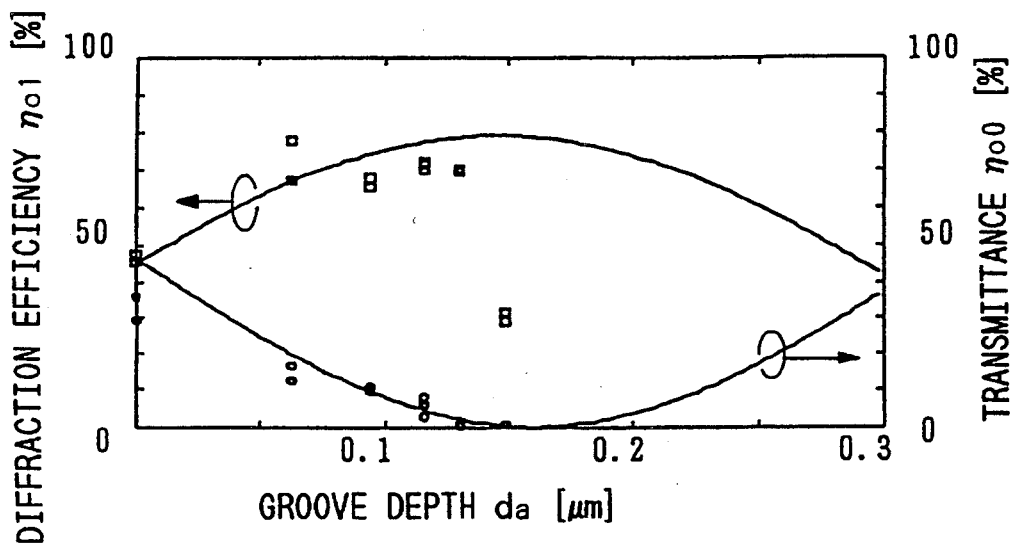
FIG. 2 is a diagram of the relation between the depth of the grooves and the measured values of the diffraction efficiency and the transmittance with respect to samples of the polarization separating element of the first embodiment for an ordinary ray of light having a wavelength of 780 nm.

FIG. 2 shows the measured values of the diffraction efficiency $\eta o1$ and the transmittance $\eta o0$ with respect to the samples of the polarization separating element for an ordinary ray of light having a wavelength of 780 nm. As shown in FIG. 2, for an ordinary ray of light, the diffraction efficiency $\eta o\ 1$ increased but the transmittance $\eta o0$ decreased in accordance with increases in the depth "da" of the grooves 24. These changes in the diffraction efficiency $\eta o1$ and the transmittance $\eta o0$ occurred in a limited range of the depth "da" of the grooves 24 below a given value of about 0.15 $\mu$m. The cause of these changes in the diffraction efficiency $\eta o1$ and the transmittance $\eta o0$ was that the phase difference between the light passing through the uncovered portions of the substrate and the light passing through the covered portions of the substrate increased as the depth of the grooves 24 increased.

Figure 3:
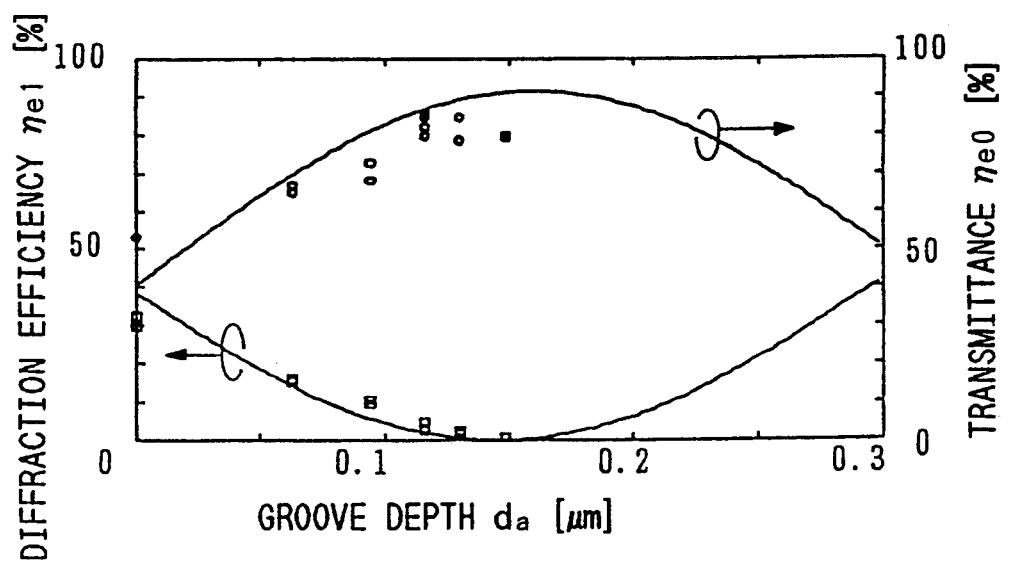
FIG. 3 is a diagram of the relation between the depth of the grooves and the measured values of the diffraction efficiency and the transmittance with respect to samples of the polarization separating element of the first embodiment for an extraordinary ray of light having a wavelength of 780 nm.

FIG. 3 shows the measured values of the diffraction efficiency $\eta e1$ and the transmittance $\eta e0$ with respect to the samples of the polarization separating element for an extraordinary ray of light having a wavelength of 780 nm. As shown in FIG. 3, for an extraordinary ray of light, the diffraction efficiency $\eta e1$ decreased but the transmittance $\eta e0$ generally increased in accordance with increases in the depth "da" of the grooves 24. In addition, the transmittance $\eta e0$ peaked at about a groove depth of 0.13 $\mu$m, and decreased as the groove depth increased from 0.13 $\mu$m. These changes in the diffraction efficiency $\eta e1$ and the transmittance $\eta e0$ occurred in a limited range of the depth "da" of the grooves 24 below a given value of about 0.15 $\mu$m. The cause of these changes in the diffraction efficiency $\eta e1$ and the transmittance $\eta e0$ was that the grooves 24 canceled the increase in the refractive index by the proton-exchanged layers 20. At a groove depth of 0.13 $\mu$m, the extinction ratio was equal to 24 dB and 17 dB with respect to the transmitted light and the diffracted light respectively.

The polarization separating element may be modified as follows. According to a first modification of the polarization separating element, the x-plane lithium-niobate substrate is replaced by a y-plane lithium-niobate substrate. In a second modification of the polarization separating element, the lithium-niobate substrate is replaced by a lithium tantalate. In a third modification of the polarization separating element, the lithium-niobate substrate is replaced by a substrate of a mixed crystal of lithium niobate and lithium tantalate. A fourth modification of the polarization separating element includes a nonreflective coat made of dielectric material.

Figure 4:
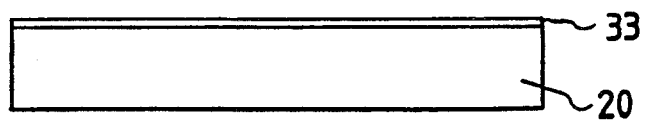
FIGS. 4–8 are sectional views of a substrate at different stages during the fabrication of the polarization separating element of the first embodiment.
Figure 5:
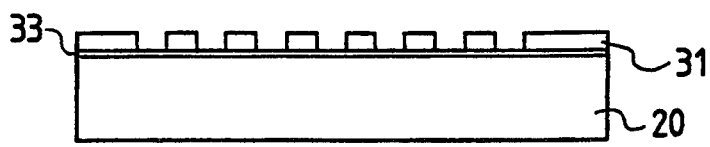
Figure 6:
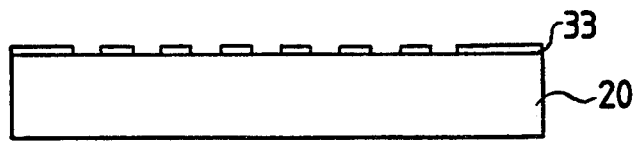
Figure 7:
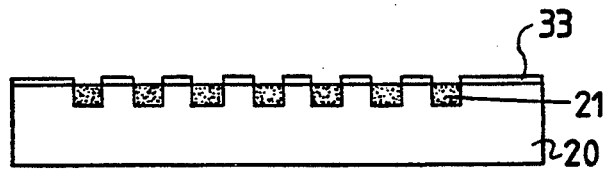
Figure 8:
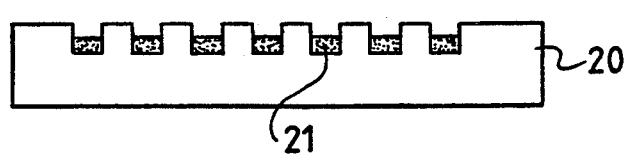

The polarization separating element of FIG. 1 was fabricated as follows. First, an x-plane lithium-niobate substrate 20 was prepared. As shown in FIG. 4, a layer 33 of tantalum was formed on an upper surface of the lithium-niobate substrate 20 by a vapor deposition process. Then, as shown in FIG. 5, a predetermined pattern of resist 31 was formed on an exposed surface (an upper surface) of the tantalum layer 33 by photolithography. Subsequently, as shown in FIG. 6, the portions of the tantalum layer 33 which were uncovered from the resist 31 were removed by an etching process while the resist 31 was used as a mask. Thus, only the portions of the tantalum layer 33 which were covered by the mask 31 remained on the lithium-niobate substrate 20. In this way, the tantalum layer 33 on the lithium-niobate substrate 20 was made into a given pattern equal to the pattern of the resist 31. After the resist 31 was removed, the lithium-niobate substrate 20 with the pattern of the tantalum layer 33 was held in pyrophosphoric acid and was subjected to a heating process at a temperature of 230° C. for about 110 minutes. During the heating process, the pattern of the tantalum layer 33 was used as a mask. Consequently, as shown in FIG. 7, upper regions of the portions of the lithium-niobate substrate 20 which were uncovered from the mask 33 were made into proton-exchanged layers 21. Only a small amount of the surface portions of the lithium-niobate substrate 20 was etched away by the pyrophosphoric acid. Subsequently, the lithium-niobate substrate 20 with the proton-exchanged layers 21 and the tantalum mask 33 was subjected to an etching process which used known etching liquid containing hydrofluoric acid. This etching liquid had such a selective etching function as to operate on the proton-exchanged layers 21 but not operate on the lithium-niobate substrate 20. The tantalum mask 33 was removed by the etching process. The proton-exchanged layers 21 were partially removed by the etching process so that grooves 24 occurred above the remaining proton-exchanged layers 21 as shown in FIG. 8. The depth of the grooves 24 and the depth of the remaining proton-exchanged layers 21 were adjusted by controlling the interval of time during which the etching process remained executed. For example, in the case where the etching liquid containing 45% hydrofluoric acid and 55% water by weight was used, the desired value of the depth of the grooves 24 was attained by maintaining the etching process for about 7 minutes.

It should be noted that the etching liquid may also be of other fluorine-based types such as the type using a mixture of hydrofluoric acid and ammonium fluoride or the type using a mixture of hydrofluoric acid and nitric acid. In addition, the etching liquid may be replaced by fluorine-based etching gas. Furthermore, the etching process may also be of types other than the previously-mentioned type.

The proton-exchanged layers 21 may be formed by other ways such as a way in which the substrate is held in benzoic acid and is subjected to a heating process while a pattern of aluminum is used as a mask.

DESCRIPTION OF THE SECOND PREFERRED EMBODIMENT

A second embodiment of this invention is similar to the embodiment of FIGS. 1–8, and 10 except for design changes indicated hereinafter.

A polarization separating element according to the second embodiment diffracts an extraordinary ray of light but does not diffract an ordinary ray of light. This function of the polarization separating element is attained by the following arrangement. The depth "da" of grooves 24 (see FIG. 1) and the depth "dp" of proton-exchanged layers 21 (see FIG. 1) are chosen so that the ordinary-ray phase-change quantity $\Delta\phi o$ given by the equation (3) will approximately equal a multiple of $2\pi$ and the extraordinary-ray phase-change quantity $\Delta\phi e$ given by the equation (5) will appreciably differ from a multiple of $2\pi$. It is preferable that the extraordinary-ray phase-change quantity $\Delta\phi e$ approximately equals an odd-number multiple of $\pi$ ($\pi$ times an odd integer). These conditions are expressed by the following equations.

$$(2\pi/\lambda) \bullet (\Delta no \bullet dp + \Delta noa \bullet da) = 2\, m\pi \quad (11)$$

$$(2\pi/\lambda) \bullet (\Delta ne \bullet dp + \Delta nea \bullet da) = -(2\, n+1)\pi \quad (12)$$

where "m" and "n" denote arbitrary integers respectively.

Especially, in the case where m=1 and n=0, these values are placed into the equations (11) and (12) and thus the depth "da" of the grooves 24 and the depth "dp" of the proton-exchanged layers 21 are given as:

$$da = (\lambda/2)\{(2\Delta ne - \Delta no)/(\Delta no \Delta nea - \Delta ne \Delta noa)\} \quad (13)$$

$$dp = -(\lambda + \Delta noa \bullet da)/\Delta no \quad (14)$$

With respect to light having a wavelength of, for example, 0.78 μm (780 nm), the depth "da" of the grooves 24 and the depth "dp" of the proton-exchanged layers 21 are preferably equal to about 0.56 μm and 1.857 μm respectively according to the equations (13) and (14).

DESCRIPTION OF THE THIRD PREFERRED EMBODIMENT

Figure 9:
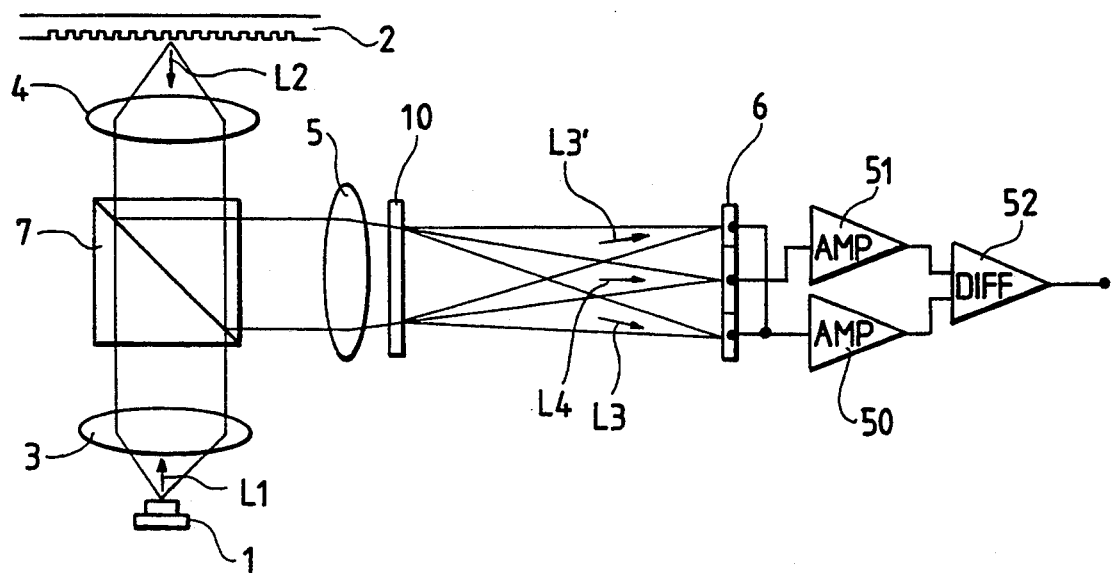
FIG. 9 is a diagram of an optical information processing apparatus according to a third embodiment of this invention.

With reference to FIG. 9, an optical information processing apparatus includes a semiconductor laser 1, a magneto-optical disk 2, lenses 3, 4, and 5, a photodetector array 6, a polarization beam splitter 7, and a polarization separating element 10. The polarization separating element 10 is equal to the polarization separating element of the first embodiment, the second embodiment, a fourth embodiment, a fifth embodiment, or a sixth embodiment. It should be noted that the fourth embodiment, the fifth embodiment, and the sixth embodiment will be described later.

The semiconductor laser 1 emits light L1 which is collimated by the lens 3 into forward parallel rays. The forward parallel rays pass through the polarization beam splitter 7, and are then focused by the lens 4 into a spot on a surface of the magneto-optical disk 2. The polarization beam splitter 7 is designed so as to reflect s-polarized light at about 50% and to reflect p-polarized light about 100%. The semiconductor laser 1 is designed so that the light emitted therefrom will enter the polarization beam splitter 7 as s-polarized light. The Kerr effect causes the polarization plane of the light on the surface of the magneto-optical disk 2 to rotate in accordance with information recorded on the magneto-optical disk 2. Thus, the light is forced to carry the information.

The light is reflected by the surface of the magneto-optical disk 2, traveling back from the surface of the magneto-optical disk 2 and becoming backward light L2 which is incident to the lens 4. The backward light is collimated by the lens 4 into backward parallel rays. The backward parallel rays are incident to the polarization beam splitter 7. Approximately 100% of p-polarized light of the backward parallel rays is reflected toward the lens 5 by the polarization beam splitter 7. On the other hand, approximately 50% of s-polarized light of the backward parallel rays passes through the polarization beam splitter 7.

The light reflected by the polarization beam splitter 7 passes through the lens 5, and then encounters the polarization separating element 10. The light is separated by the polarization separating element 10 into diffracted light beams L3 and L3' and a nondiffracted light beam L4. The polarization separating element 10 is arranged so that the polarization separating direction thereof will be angularly offset or spaced from the p-polarized light direction and the s-polarized light direction by an angle of 45°. The diffracted light beams L3 and L3' and the nondiffracted light beam L4 are applied to different segments of the photodetector array 6, being converted into corresponding electric signals thereby respectively. The electric signals which correspond to the diffracted light beams L3 and L3' are added or summed, and the resultant signal L3+L3' is enlarged by an amplifier 50. The electric signal which corresponds to the nondiffracted light beam L4 is enlarged by an amplifier 51. The output signals of the amplifiers 50 and 51 are fed to a differential amplifier 52 so that a signal of the difference L4−L3+L3' therebetween is generated thereby. The difference signal L4−L3+L3' is used as an information signal.

Provided that the grating vector of the diffraction grating of the polarization separating element 10 is varied position to position and thereby the wavefronts of diffracted light beams are suitably adjusted, control signals such as a focusing error signal and a tracking error signal can be detected in a known method using a hologram element.

The efficiency of the polarization separating element 10 is equal to about 100% with respect to the nondiffracted light L4. The efficiency of the polarization separating element 10 is equal to about 80% with respect to the diffracted light (L3+L3'). This efficiency difference would counteract the cancellation of in-phase noise components by the operation of the differentiating amplifier 52. Accordingly, the amplification factor of the amplifier 50 is set greater than the amplification factor of the amplifier 51 in order to compensate for the previously-mentioned efficiency difference related to the polarization separating element 10.

DESCRIPTION OF THE FOURTH PREFERRED EMBODIMENT

Figure 11:
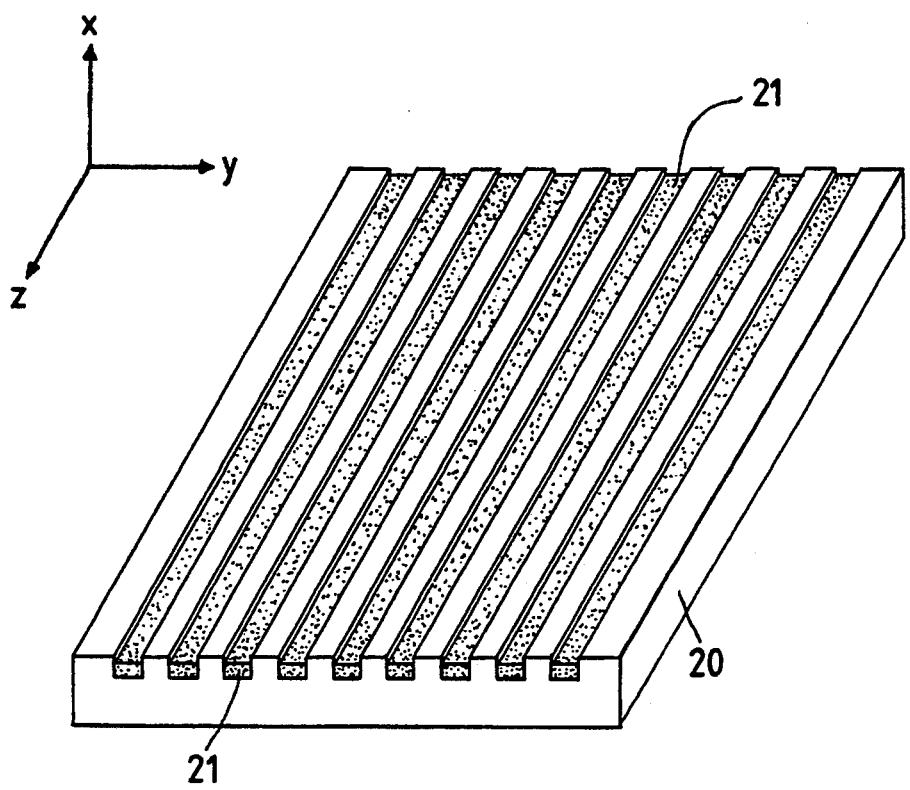
FIG. 11 is a perspective view of a polarization separating element according to a fourth embodiment of this invention.

FIG. 11 shows a fourth embodiment of this invention which is similar to the embodiment of FIGS. 1–8, and 10 except for design changes indicated hereinafter. In the embodiment of FIG. 11, proton-exchanged layers 21 elongate along the z-axis of a lithium-niobate crystal in a substrate 20. In addition, the proton-exchanged layers 21 are spaced in the y-axis of the lithium-niobate crystal.

It should be noted that the design of the fourth embodiment may be applied to the second embodiment.

DESCRIPTION OF THE FIFTH PREFERRED EMBODIMENT

Figure 12:
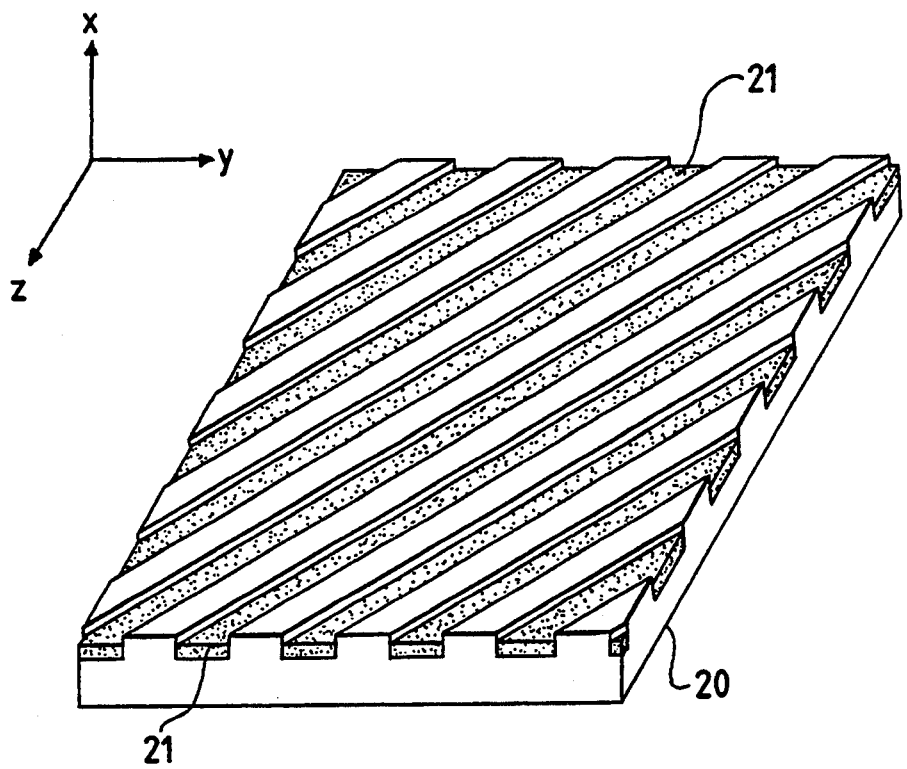
FIG. 12 is a perspective view of a polarization separating element according to a fifth embodiment of this invention.

FIG. 12 shows a fifth embodiment of this invention which is similar to the embodiment of FIGS. 1-8, and 10 except for design changes indicated hereinafter. In the embodiment of FIG. 12, proton-exchanged layers 21 elongate along a direction oblique to both the y-axis and the z-axis of a lithium-niobate crystal in a substrate 20. In addition, the proton-exchanged layers 21 are spaced in a direction oblique to both the y-axis and the z-axis of the lithium-niobate crystal.

It should be noted that the design of the fifth embodiment may be applied to the second embodiment.

DESCRIPTION OF THE SIXTH PREFERRED EMBODIMENT

Figure 13:
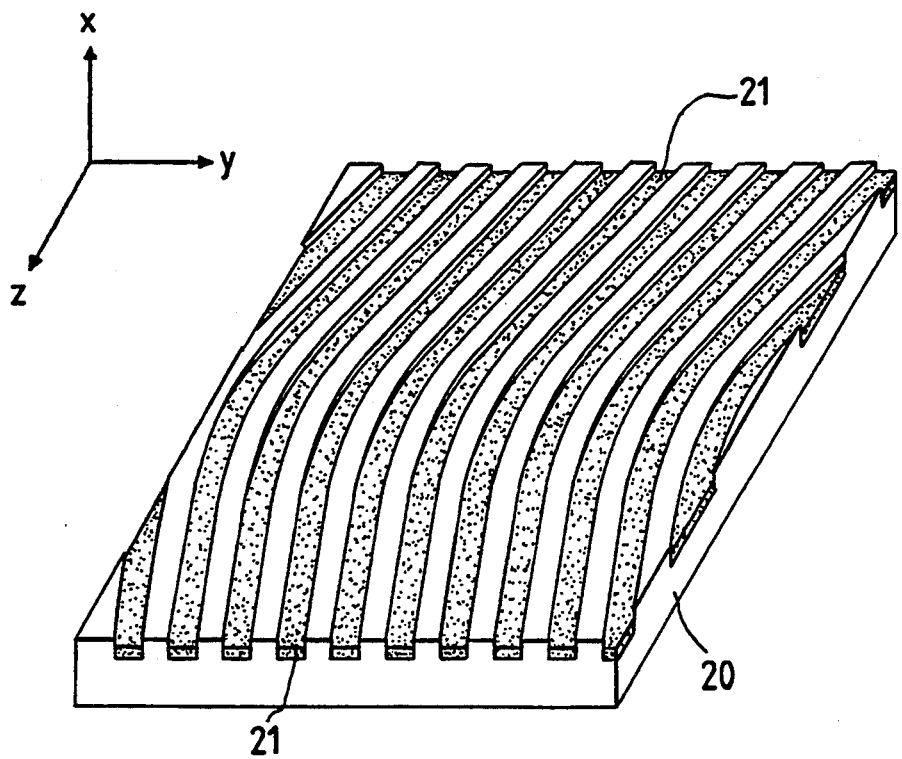
FIG. 13 is a perspective view of a polarization separating element according to a sixth embodiment of this invention.

FIG. 13 shows a fifth embodiment of this invention which is similar to the embodiment of FIGS. 1-8, and 10 except for design changes indicated hereinafter. In the embodiment of FIG. 13, proton-exchanged layers 21 elongate along curved lines.

It should be noted that the design of the sixth embodiment may be applied to the second embodiment.

What is claimed is:

1. An optical element comprising:
a crystal of $LiTa_xNb_{1-x}O_3$ which has one of an x-surface and a y-surface, where X denotes an atomic fraction and $0 \leq X \leq 1$;
proton-exchanged layers periodically extending on one of the x-surface and the y-surface of the crystal; and
grooves extending in said one of the x-surface, and the y-surface of the crystal and having bottoms which are defined by surfaces of the proton-exchanged layers;
wherein ordinary light which has passed through the proton-exchanged layers and the grooves is out of phase with respect to ordinary light which has passed through a region of the crystal outside the proton-exchanged layers and the grooves by a quantity of $(2n+1)\pi$, and n denotes an arbitrary integer; and
wherein extraordinary light which has passed through the proton-exchanged layers and the grooves is out of phase with respect to extraordinary light which has passed through a region of the crystal outside the proton-exchanged layers and the grooves by a quantity of $2m\pi$, and m denotes an arbitrary integer.

2. An optical element comprising:
a crystal of $LiTa_xNb_{1-x}O_3$ which has one of an x-surface and a y-surface, where X denotes an atomic fraction and $0 \leq X \leq 1$;
proton-exchanged layers periodically extending on one of the x-surface and the y-surface of the crystal; and
grooves extending in said one of the x-surface and the y-surface of the crystal and having bottoms which are defined by surfaces of the proton-exchanged layers;
wherein ordinary light which has passed through the proton-exchanged layers and the grooves is out of phase with respect to ordinary light which has passed through a region of the crystal outside the proton-exchanged layers and the grooves by a quantity of $2m\pi$, and m denotes an arbitrary integer; and
wherein extraordinary light which has passed through the proton-exchanged layers and the grooves is out of phase with respect to extraordinary light which has passed through a region of the crystal outside the proton-exchanged layers and the grooves by a quantity of $(2n+1)\pi$, and n denotes an arbitrary integer.

3. An optical element comprising:
a crystal of $LiTa_xNb_{1-x}O_3$ which has one of an x-surface and a y-surface, where X denotes an atomic fraction and $0 \leq X \leq 1$;
proton-exchanged layers periodically extending on one of the x-surface and the y-surface; and
grooves extending in said one of the x-surface and the y-surface of the crystal and having bottoms which are defined by surfaces of the proton-exchanged layers;
wherein ordinary light which has passed through the proton-exchanged layers and the grooves is out of phase with respect to ordinary light which has passed through a region of the crystal outside the proton-exchanged layers and the grooves by a quantity different from $2n\pi$, and n denotes an arbitrary integer; and
wherein extraordinary light which has passed through the proton-exchanged layers and the grooves is out of phase with respect to extraordinary light which has passed through a region of the crystal outside the proton-exchanged layers and the grooves by a quantity of $2m\pi$, and m denotes an arbitrary integer.

4. An optical element comprising:
a crystal of $LiTa_xNb_{1-x}O_3$ which has one of an x-surface and a y-surface, where X denotes an atomic fraction and $0 \leq X \leq 1$;
proton-exchanged layers periodically extending on one of the x-surface and the y-surface; and
grooves extending in said one of the x-surface and the y-surface of the crystal and having bottoms which are defined by surfaces of the proton-exchanged layers;
wherein ordinary light has passed through the proton-exchanged layers and the grooves is out of phase with respect to ordinary light which has passed through a region of the crystal outside the proton-exchanged layers and the grooves by a quantity different from $2m\pi$, and m denotes an arbitrary integer; and
wherein extraordinary light which has passed through the proton-exchanged layers and the grooves is out of phase with respect to extraordinary light which has passed through a region of the crystal outside the proton-exchanged layers and the grooves by a quantity of $2n\pi$, and n denotes an arbitrary integer.

* * * * *